July 13, 1954

C. MEYER 2,683,345

SIDE DELIVERY HAYRAKE

Filed Nov. 3, 1952

INVENTOR
CHESTER MEYER

BY *Gustave Miller*

ATTORNEY

July 13, 1954　　　C. MEYER　　　2,683,345
SIDE DELIVERY HAYRAKE
Filed Nov. 3, 1952　　　　　　　4 Sheets-Sheet 2
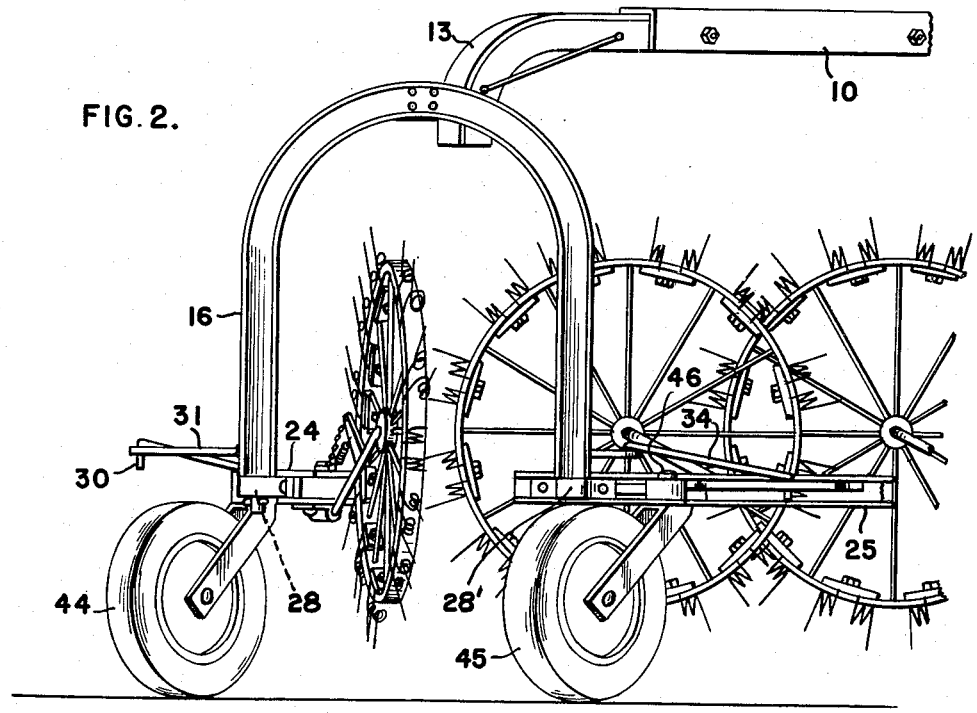
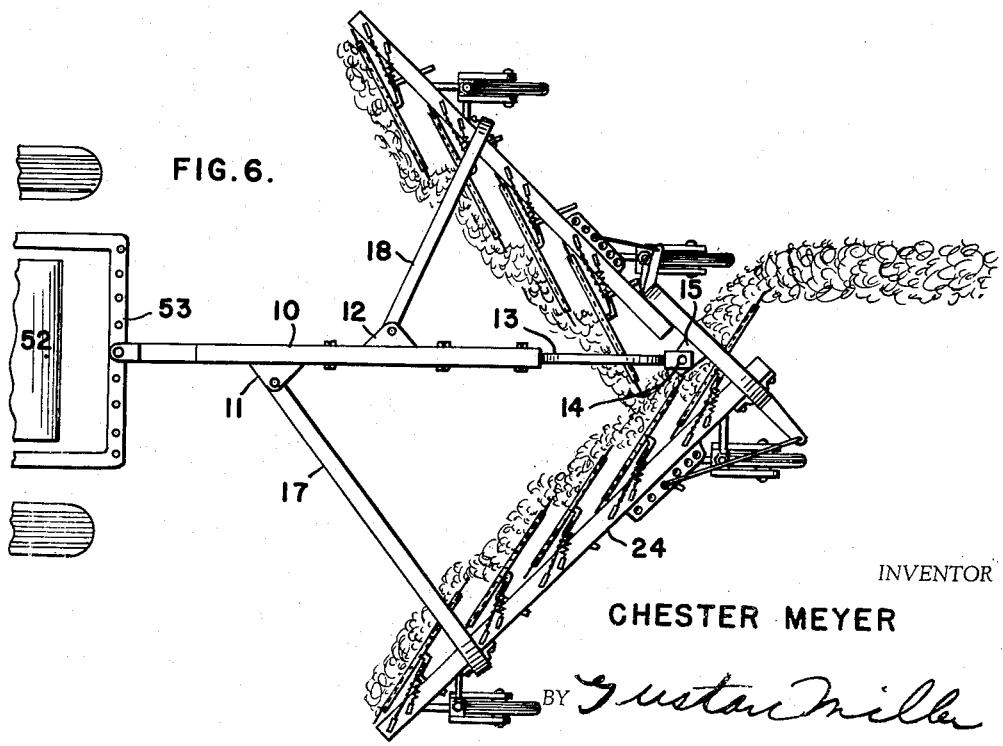
INVENTOR
CHESTER MEYER
ATTORNEY

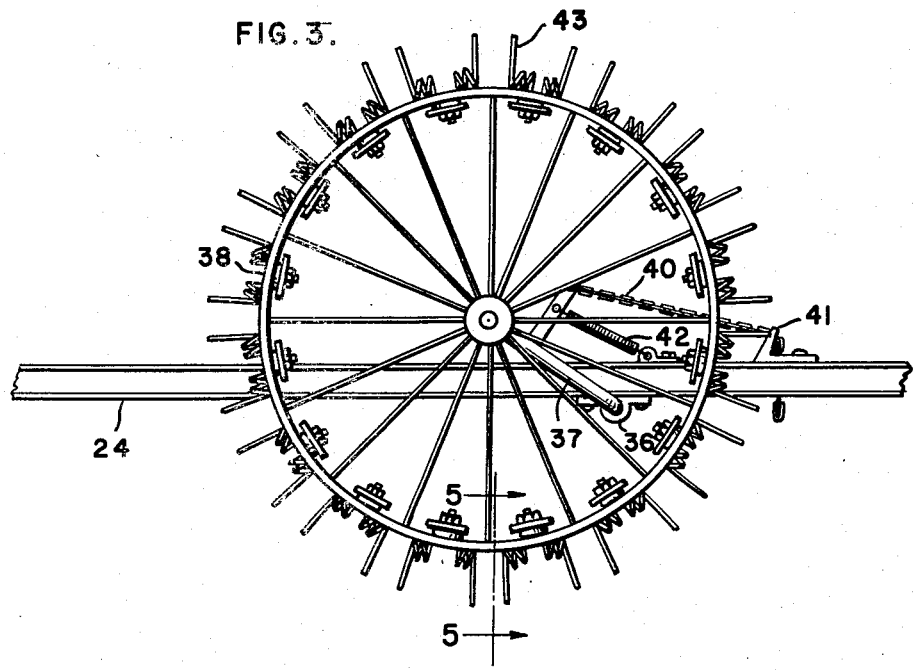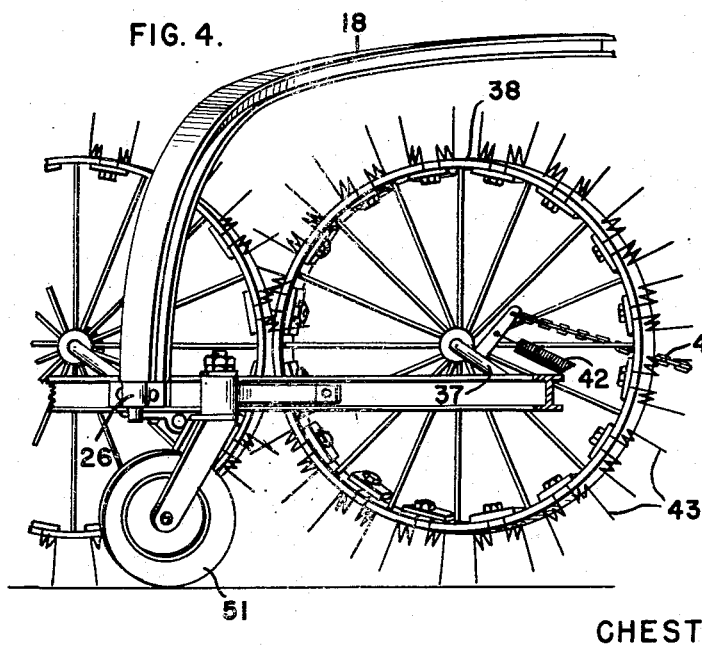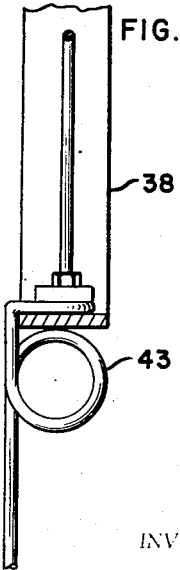
INVENTOR
CHESTER MEYER

July 13, 1954 — C. MEYER — 2,683,345
SIDE DELIVERY HAYRAKE
Filed Nov. 3, 1952 — 4 Sheets-Sheet 4

INVENTOR
CHESTER MEYER
BY Gustave Miller
ATTORNEY

UNITED STATES PATENT OFFICE 2,683,345

SIDE DELIVERY HAYRAKE

Chester Meyer, Minden, Nev.

Application November 3, 1952, Serial No. 318,429

1 Claim. (Cl. 56—377)

The present invention relates to agricultural implements and more particularly to a side delivery hay rake.

The types of side delivery hay or forage crop rakes presently in use do not serve efficiently in gathering the cut hay or other plant into easily stacked or lifted windrows. The side delivery rolls the hay into a stranded roll with the most of the plant stems lying in one direction. Furthermore, being towed directly behind the tractor and having its delivery point to one side or the other, the conventional side delivery rake rolls up the windrow some distance to the left or right of the tractor path, making it difficult for the tractor driver to lay straight or curved windrows exactly in the path of the tractor which is desirable on contoured fields.

The principal object of the invention is to provide a side delivery type of hay rake which effectively intermingles most if not all of the plant stems and leaves into a loosely knit windrow.

A further object is to provide a rake which gathers cut hay or other forage crop from the ground on either side of the tractor and to its rear, and one which piles the hay into a windrow directly behind the tractor operator.

A still further object of the invention is to provide for a rake which sweeps the ground with resilient tines which do not tear the sod or plant root but bend sufficiently to provide a raking and tossing action, thereby fluffing the hay and forming a loosely knit windrow.

A still further object is to provide a rake which intermingles hay from two sets of raking wheels so that the windrow thusly formed of hay mingled from two sides is not a roll of strands of hay spilled from just one side. Such a windrow of hay rolled in one direction and spilled by the last raking wheel is frequently rolled still further and out of line by a gust of wind or may even roll on a slope of the field. A windrow, such as the product of this invention, rolled from two directions and interlaced has less tendency to be disturbed by the wind or slope of the ground.

A further object is to provide a wide rake with a mechanism that is simple to operate and inexpensive to construct which will narrow the implement for transport on highways or through gates.

Still another object is to provide a rake which can be adjusted to form a wide, loose windrow or a tightly knit windrow so that hay that needs extra long curing can be loosely rolled, while hay that is already cured can be rolled into a tightly knit windrow easy to load.

Another object is to provide a rake which will track easily and turn in either direction.

Other objects and advantages of the invention will appear from the further description and with reference to the drawings in which:

Fig. 2 is a side view in elevation of the rear of the rake, showing the delivery point of the windrow formed by the two sets of raking wheels, taken on line 2—2 of Fig. 1.

Fig. 3 is a plan view of a single raking wheel, taken on line 3—3 of Fig. 1.

Fig. 4 is a detailed view of a portion of the invention taken on line 4—4 of Fig. 1.

Fig. 5 is a view partly in section taken on line 5—5 of Fig. 3.

Fig. 6 is a top view of the invention showing the formation of a single windrow from the two sets of raking wheels.

Figure 1:
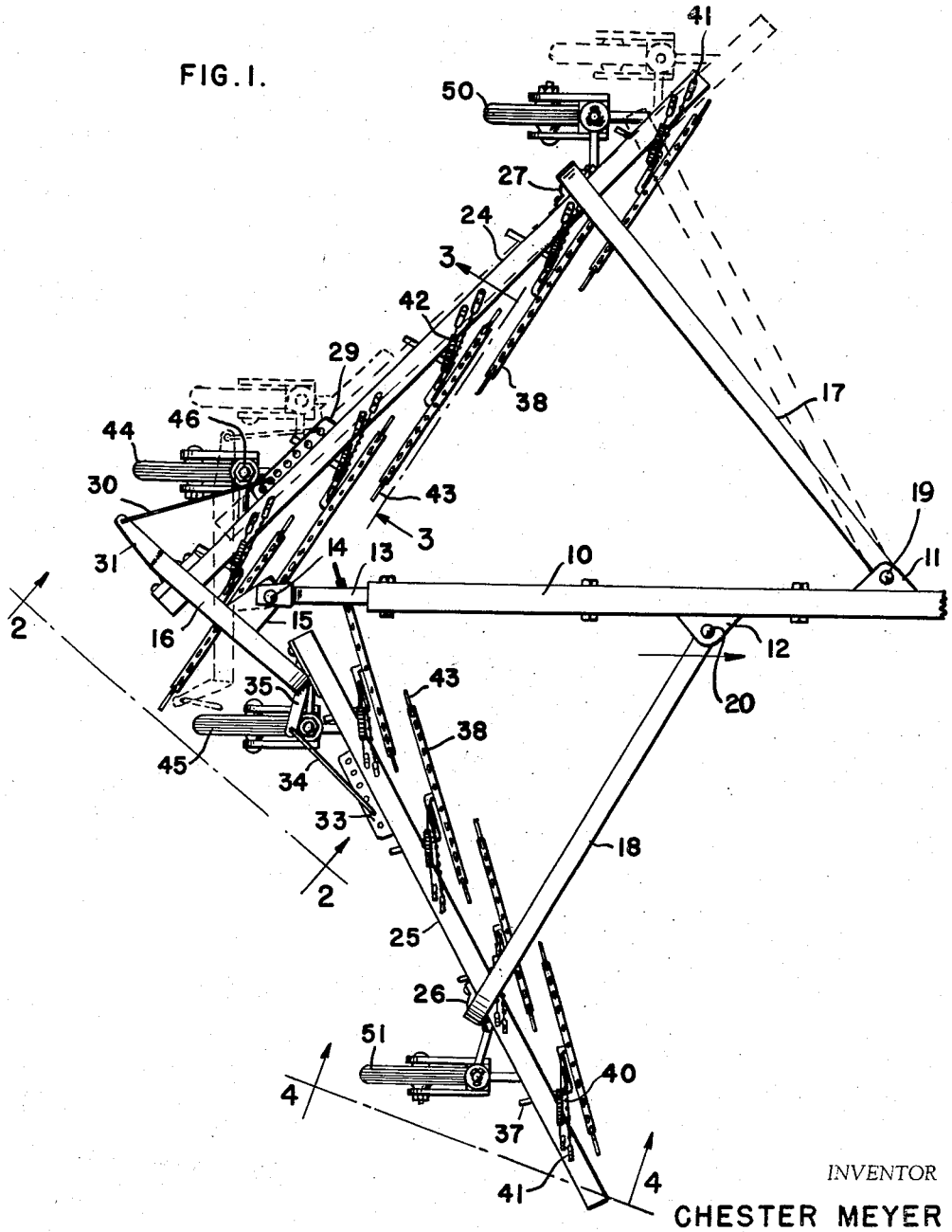
Fig. 1 is a top plan view of the rake in working or expanded condition.

Referring to the drawings in which like numerals indicate like parts throughout the several views, in Fig. 1 it will be seen that the channel tongue 10 has a first pinion bracket 11, a second bracket 12 and a telescoping curved arm 13, which in turn has a pivot pin 14 engaging the bracket 15 of the arch member 16. Brackets 11 and 12 support right and left arch arms 17 and 18 respectively by means of pivot pins 19 and 20, and the arch arms 17 and 18 pivot in sockets 26 and 27 on the side beams 24 and 25, one socket 26 being seen in Fig. 4.

Figure 7:
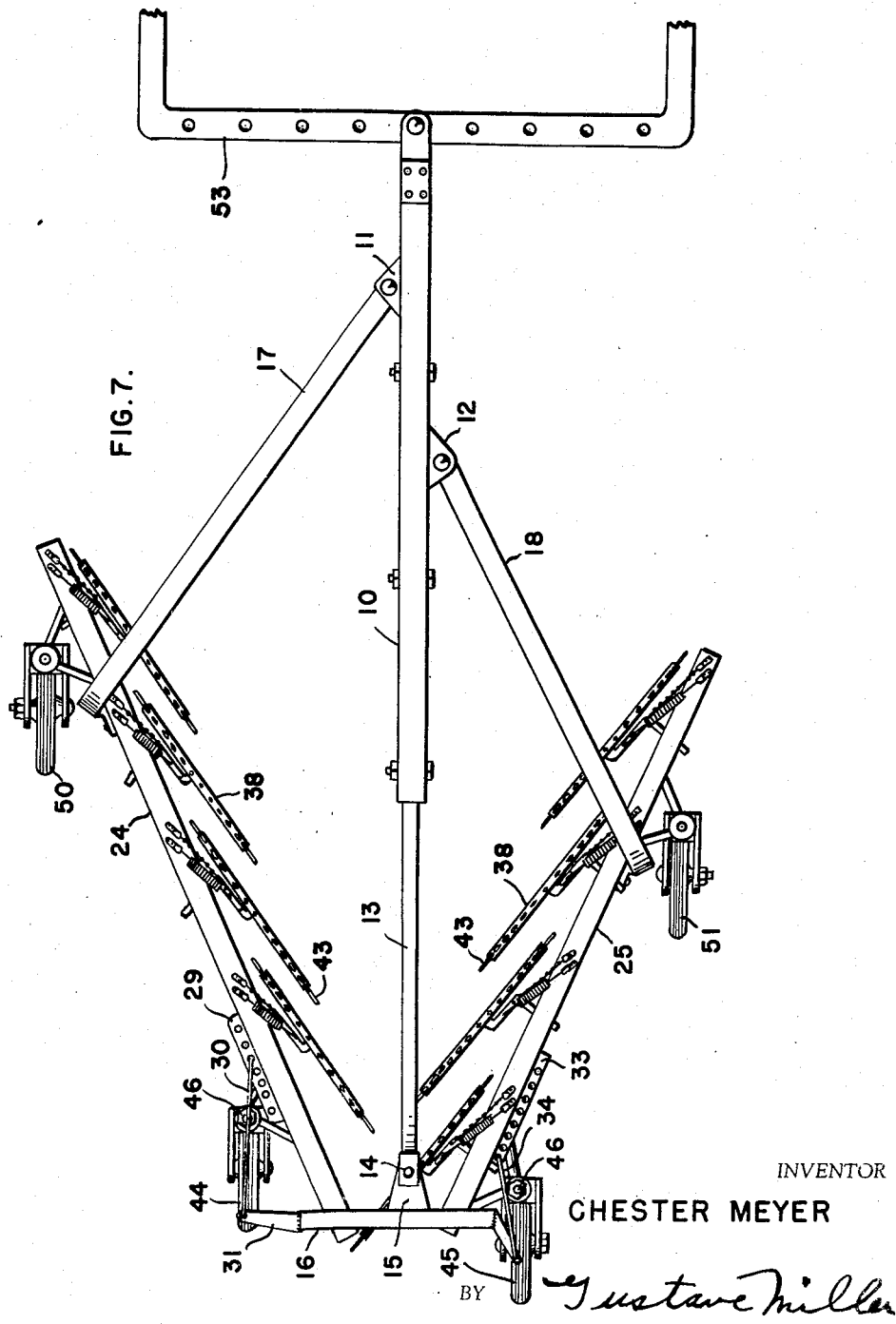
Fig. 7 is a top view of the rake in contracted condition for transport on the highway or through gates.

The arch member 16 likewise pivots on beams 24 and 25 by similar sockets 28 and 28'. This permits the channel tongue 10 and arm 13 to be telescoped together, moving the beams 24 and 25 outwardly to the position shown in Fig. 1 or inwardly as in Fig. 7. Arch member 16 being pivotally connected to both the arm 13 and the beams 24 and 25 permits the adjustment of the beams relative to each other, as shown in dotted lines in Fig. 1. This adjustment is maintained by the hole plate 29, hook bar 30, and lever arm 31 welded or otherwise secured to the arch member 16 on the left leg thereof. A similar hole plate 33, hook bar 34 and lever arm 35 maintain the adjustment of the right leg of the arch member 16 to right beam 25. On each of beams 24 and 25 are fastened bearing hangers 36 which hold offset axles 37 of the raking wheels 38 which are adjustably positioned by the chain 40 and chain catch 41, with spring 42 providing each raking wheel 38 a resilient contact with the ground. The periphery of each of wheels 38 has a multiplicity of spring tines 43, most clearly shown in Figs. 4 and 5. Obviously, the number of raking wheels may be varied, and the frame may be made of greater length.

The wheels 44 and 45 adjustably secured to beams 24 and 25 respectively support the rear and center of the rake and are locked in position by lock nuts 46, while wheels 50 and 51 are rubber-mounted and are free to turn, castor-fashion, as the rake is pulled by the tractor 52 and the drawbar 53. Lever arms 31 and 35 are necessarily secured at different angles to arch member 16 so that the beam 25 may be swung ahead of beam 24, thus putting the raking wheels in slightly overlapping lines, the amount of overlap governing the degree of intermix of the leftwardly moving hay roll with that of the right. The tines lightly touch the ground and sod, giving rotary motion to each wheel, due to the angle of the beams and associated wheels with the direction of travel. The angle of each beam to the direction of travel in turn governs the degree of tossing of the hay forward and along to the next raking wheel, the tines lightly catching in the sod and releasing to spring forward throwing the strands of hay at right angles to the wheel face, or along the line of raking wheels rearwardly. For damp hay, or a forage crop packed against the ground by rain, the raking wheels are lowered for more positive contact of tines with the sod and the greater tossing action ensuing. Dry and brittle hay stalks and leaves require less handling, so the beams are adjusted to a lesser angle with respect to the tongue, the raking wheels raised to a less positive touch of the ground, and the windrow is less compacted with the hay strands less intermingled or broken.

These results are obtained in operation by unbolting bar 13 from tongue 10 and telescoping it or extending it as desired, and each raking wheel 38 may be raised by its chain 40. Wheels 44 and 45 are preferably locked so that the rake follows the tractor but in case of long windrows on a slight slope, as in contour farming, the two rear wheels may be locked at any angle to prevent side slip of the rake.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

A hay rake for towing behind a tractor or the like comprising a centrally located towing tongue, a laterally disposed beam on each side of said tongue, a wheel at each end of each of said beams, castor means connecting the outer end of each of said beams to its associated wheel, swivel means including locks for preventing castoring connecting the inner wheel of each beam to its associated beam, a plurality of vertically adjustable axles spaced along each beam, a raking wheel mounted on each of said axles, spring-biasing means for maintaining each of said raking wheels in light contact with the ground, raking tines around the periphery of each of said raking wheels, a laterally extending first arm pivotally connecting the outer end of one of said beams with said tongue near the forward end thereof, a second laterally extending arm connecting in similar fashion the other of said beams to said tongue at a point slightly rearward of the point of connection of said first arm, an arch-shaped member connecting the inner ends of said beams together, a swivel connecting the said tongue to said arch-shaped member at the center thereof, a bar pivotally mounted on each end of said arch-shaped member adjacent its connection to said beams, each of said bars ending in hooks engageable with holes in a plate secured one each to each of said beams for locking said beams at desired angles to said member, and telescoping means in said tongue for varying the distance between said swivel at the end thereof and the points of connection of said arms with said tongue.

References Cited in the file of this patent

UNITED STATES PATENTS

| Number | Name | Date |
| --- | --- | --- |
| 2,481,995 | Godley | Sept. 13, 1949 |
| 2,602,280 | Crowe et al. | July 8, 1952 |